3,454,404
PROCESS FOR MANUFACTURE OF
DEFATTED SOYBEANS
Haruo Watanabe, Yokohama-shi, Japan, assignor to
Showa Sangyo Kabushiki Kaisha, Tokyo, Japan
No Drawing. Filed Oct. 4, 1965, Ser. No. 492,835
Int. Cl. A23l 1/20
U.S. Cl. 99—98                              8 Claims

ABSTRACT OF THE DISCLOSURE

A process for preparing defatted soybeans by treating soybeans with an aqueous solution of an alkali metal salt of a sulfurous acid such that said soybeans absorb from 0.1 to 0.5% by weight of said salt and extracting the fat from soybeans.

---

It has been hitherto well known to obtain defatted soybeans, by the extraction method whereby soybeans are treated with solvents at high temperatures. A method has also been proposed whereby soybeans are treated with solvents at low temperatures for the purpose of reducing the degeneration of soybean proteins as much as possible. It has been well known as described in various publications, that the defatted soy beans are useful for various purposes.

In industrial practice, the manufacture of defatted soybeans was hitherto practiced on a small scale, using extractors of the rotary batch type, for the purpose of obtaining the material for the making of adhesives for the manufacture of veneer board.

At present, owing to the development of methods comprising the successive extraction of soybean oil on a considerably extensive scale, defatted soybeans are obtained which are useful for making bread, cakes, tofu (edible soybean curd), fried tofu, kneaded edible products, etc.

When an extracting vessel is used, owing to the possibility whereby the solvent may be removed under comparatively low temperatures, and can be completed in a short time, commonly only a slight degeneration of soybean proteins and colouration of defatted soybeans can be expected or compared with the use of a battery extracting vessel.

Especially remarkable effects can be expected when a vapor-desolventizer is used, whereby solvent is evaporated by circulating super-heated solvent vapour, or a flash-desolventizer system whereby defatted soybeans flakes are instantly dried in the stream of superheated vapor of solvent, or the system of blowing an inactive gas in the defatted soybeans, by which traces of solvent in the defatted soybeans are expelled, or the system of expelling smelly materials by the blowing of inactive gases or the lowering of atmospheric pressure. Moreover, the quantity of water-soluble proteins in the defatted soybeans are remarkably increased.

But, because soybean proteins are very sensitive to heat, moisture and water, it is impossible to prevent the degeneration and coloration of defatted soybeans altogether even if the above described improved treatments are practiced because the temperature during the extraction of soybean oil is usually raised to 50°–60° C., and the expelling of solvent is achieved at a temperature of more than the boiling temperature of solvents (usually 80°–90° C.). Moreover the conditionings of soybeans or crushed soybeans for heating and controlling water content are essential prior to the extraction for the purpose of carrying out a smooth operation of flaking soybeans or crushing soybeans. Moreover, when the excessive content of moisture in the soybeans is excessive, it is necessary to spell the excessive moisture by heating the soybeans before storage or during the extraction.

For the above reasons, the defatted soybeans produced in the present soybean industry, even if the various improved treatments are practiced, are inferior to the raw soybeans both in water soluble protein content and quality (the property of the proteins, colour, flavour, etc.). The present invention relates to a process for the manufacture of defatted soybeans which comprises treating soybeans with an aqueous solution of alkali salts (for example, sodium or potassium salt) of sulphurous acid, hyposulphurous acid, or bisulphurous acid previous to or during the process of extraction of the soybean oil whereby said solution is absorbed in the soybeans.

By the process of the present invention, the reductive, anti-oxidizing action of the above alkali salts prevents the degeneration and colouration and other deteriorations of soybean proteins during and after the process of extraction and during the storage of defatted proteins.

Suitable percentages of the above reducing agents in the soybeans which are to be subjected to extraction, is between 0.1 and 0.5% by weight.

When the percentage of reducing agent in the soybeans is less than 0.1 to 0.5%, the effects described above can not be achieved. When the percentage of reducing agent in the soybeans is more than 0.1 to 0.5% the —S—S— bridges of the soybean proteins are decomposed by reduction and an excessive formation of —SH radicals happened and the essential properties of the soybean proteins are degenerated. The reducing agents should be added as a solution to the soybeans, in order to achieve good permeation and diffusion of the reducing agents in the soybeans.

Suitable percentages of water in the aqueous solution of reducing agent, added to the soybeans, is from 1 to 2%. The addition of the aqueous solution of reducing agent to the soybeans should be done previous to or during the extraction. Crushed, or casted soybeans, are preferable because the reducing agents act effectively and the proteins contained in soybeans and said soybeans are not degenerated by heating. Moreover, the loss of reducing agents can be reduced.

The extraction and desolventation steps, which are accomplished after the treatment of soybeans with the reducing agents, may be the same as those usual methods which have hitherto been practiced as described above.

The defatted soybeans produced by the method of the present invention contain almost the same, large amount of water soluble proteins, as contained in the raw soybeans, and the quality of defatted soybeans made by the process of the present invention, are remarkably similar to raw soybeans, which are tinged with a brilliant slight yellowish green colour, and have a sweet smell.

The properties described above of defatted soybeans made by the process of the present invention, differ remarkably from those of usual defatted soybean hitherto produced, which are tinged with a greyish brown colour and have a peculiar odour.

The defatted soybeans produced by the process of the present invention can be used extensively for the manufacture of foods, for example, breads, cakes, tofu, fried tofu, edible kneaded products, miso (edible fermented soybean paste), soya, adhesives for making veneer boards, coating and sizing materials for paper-making, etc. Soybean proteins made from the defatted soybeans of the present invention can be used as a constituent of drugs and much better products in higher yields, can be obtained than the products made from defatted soybeans produced by the above described prior art methods.

For instance, when the defatted soybean meal, made by the process of the present invention is used for baking breads, brown coloured rind is not formed, which occurs when defatted soybean meal, produced by prior art methods, are used for baking bread.

The defatted soybeans obtained by the process of the present invention, owing to their high content of water soluble proteins and due to their higher absorbability of water enable the production of breads of higher volume than the breads which are baked using the defatted soybean meals hitherto produced. Consequently, bread baking employing defatted soybean meal produced by the process of the present invention is more profitable both from a nutritive standpoint and from the standpoint of reducing the cost for baking bread than baking bread using defatted soybean meal hitherto produced.

When defatted soybeans made by the process of the present invention are used to make of tofu, owing to their very high content of water soluble proteins a product and excellent quality of good colour, and good, soft touch, and good flavour similar to tofu made from raw soybeans.

Contrarily, tofu made from defatted soybeans made from defatted soybeans hitherto produced, exhibits a dark grey colouring and has a hard texture and unsavoury taste.

By the extraction of defatted soybeans made by the process of the present invention, proteins of excellent quality can be obtained in high yield. Said proteins have excellent plasticity, viscosity, adhesiveness, etc.

The defatted soybeans made by the process of the present invention even when stored for long terms have qualities similar to fresh defatted soybeans made by the process of the present invention. Although a great portion of the reducing agents added to the soybeans, before or during the extraction, are consumed by reaction with the soybean proteins during the treatment, especially during heating and steaming; some of the reducing agent is absorbed and remains in the defatted soybeans without any decomposition. Said absorbed reducing agents act as powerful antioxidizing agents for the soybean and colouration of defatted soybeans during storage can be avoided. Moreover defatted soybean made by the process of the present invention, are remarkably preserved and retain a good flavour even if the said defatted soybeans have been stored under sultry and humid conditions.

An additional advantage can be achieved of the reducing agents are added to the soybeans previously to the flaking of the soybeans. The texture of the soybeans are softened and the plasticity thereof is improved. Moreover, the heating temperature for conditioning can be lowered. Even where a slight degeneration of the soybeans occurs when treated under the conditions of high water content there is no need to dry the flakes or crushed soybeans before the treatment. Moreover, the defatted soybeans of the present invention although slightly degenerated, where treated under high temperature by hot air or steam during desolventation, and by the desolvention under high temperature, the waste of solvents can be eliminated.

Moreover by the treatment of the present invention, the formation of a powdery product can be eliminated during the treatment.

EXAMPLE 1

To crudely crushed and pared raw soybeans (water content 10.9%, water soluble protein content 90.7%) spray sodium sulphite solution in which is contained 0.2% of sodium sulphite by weight to soybeans and 1% water. Thoroughly agitate so that the soybeans to absorb uniformly the above solution, and subject them to the treatment of heating, flaking and drying etc. The product is fed to an extractor equipped with a vapor desolventizer, and the oil extracted by a solvent, i.e. hexane, desolventised, and cooled. The defatted soybeans contained 7.8% of water, 91.0% of water soluble proteins. The contents of those components are equal to those of raw soybeans, and the product is tinged with a slight yellowish green, and has a good flavour.

Contrarily, defatted soybeans made from soybeans, which were untreated with reducing agents before or during extraction, and other steps of the treatment are equal to the treatment of the present invention contain 8.3% of water and 85.7% of water soluble proteins and tinged with brown colour.

EXAMPLE 2

To flaked soybeans (water content 11.3%, water soluble protein content 89.3%), spray sodium bisulphite solution in which 0.3% sodium bisulphite to the soybeans in weight and four times of water to said salt by weight, and uniformly absorbed said solution in the soybeans, and heat, dry as usual. The product is extracted by the treatment as described in Example 1, the desolventising temperature being 10° C. higher than the desolventising temperature of that of Example 1, by using steam.

The defatted soybeans thus contain 9.9% of water, 85.8% of water soluble proteins. Moreover defatted soybean obtained by this process have good appearance and good flavour.

Contrarily, defatted soybeans made from soybeans made from soybeans flakes, which was not treated with reducing agents before or during extraction have a water content of 9.5% and water soluble proteins are remarkably reduced to 75.4%. Said usual defatted soybeans described above, even where sodium sulphite is added at the time of analysis, the water soluble protein content was only 78.5%.

What I claim is:

1. A process for the manufacture of defatted soybeans which comprises treating soybeans with an aqueous solution of an alkali metal salt of a sulfurous acid for a period of time such that said soybeans absorb from 0.1 to 0.5% by weight of said salt and extracting said soybeans with a solvent for the fat contained therein at an elevated temperature to produce defatted soybeans.

2. The process of claim 1 wherein said sulfurous acid is hyposulfurous acid.

3. The process of claim 1 where said sulfurous acid bisulfurous acid.

4. The process of claim 1 wherein said alkali metal is selected from the group consisting of sodium, and potassium.

5. The process of claim 1 wherein said soybeans are crushed.

6. The process of claim 1 wherein said soybeans are flaked.

7. The process of claim 1 wherein said treating step is effected prior to said extracting step.

8. The process of claim 1 wherein said treating and extracting steps are effected substantially simultaneously.

References Cited

UNITED STATES PATENTS 2,322,516  6/1943  Horvath _____ 99—98
3,126,286  3/1964  Moshy _____ 99—98 X

FOREIGN PATENTS 397,482  8/1933  Great Britain.

RAYMOND N. JONES, *Primary Examiner.*

W. A. SIMONS, *Assistant Examiner.*

U.S. Cl. X.R.

117—154